US012686168B2

(12) United States Patent
Rijfers et al.

(10) Patent No.: US 12,686,168 B2
(45) Date of Patent: Jul. 21, 2026

(54) PRINT HEAD MODULE AND PRINTER

(71) Applicant: Nederlandse Organisatie voor toegepast-natuurwetenschappelijk onderzoek TNO, 's-Gravenhage (NL)

(72) Inventors: Andries Rijfers, Kamerik (NL); Leonardus Antonius Maria Brouwers, Beesel (NL); Godefridus Hendrikus Willebrordus Verhoeven, Eindhoven (NL); Marcus Benedictus Hoppenbrouwers, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 361 days.

(21) Appl. No.: 17/796,405

(22) PCT Filed: Feb. 3, 2021

(86) PCT No.: PCT/NL2021/050064
§ 371 (c)(1),
(2) Date: Jul. 29, 2022

(87) PCT Pub. No.: WO2021/158102
PCT Pub. Date: Aug. 12, 2021

(65) Prior Publication Data
US 2023/0339178 A1 Oct. 26, 2023

(30) Foreign Application Priority Data
Feb. 3, 2020 (EP) ..................................... 20155139

(51) Int. Cl.
*B29C 64/209* (2017.01)
*B33Y 30/00* (2015.01)

(52) U.S. Cl.
CPC ............ *B29C 64/209* (2017.08); *B33Y 30/00* (2014.12)

(58) Field of Classification Search
CPC ....... B29C 64/209; B29C 48/00; B29C 48/02; B29C 48/0255; B29C 48/2526; B29C 48/255; B33Y 30/00
See application file for complete search history.

(56) References Cited

U.S. PATENT DOCUMENTS 3,204,290 A * 9/1965 Crompton ................ D01D 5/30
425/190
6,296,463 B1 * 10/2001 Allen ..................... D01D 4/025
425/7
(Continued)

FOREIGN PATENT DOCUMENTS

CN 107214962 A 9/2017
CN 107914395 A 4/2018
(Continued)

OTHER PUBLICATIONS

European Patent Office, International Search Report in corresponding International Application No. PCT/NL2021/050064, dated Mar. 29, 2021 (2 pages).
(Continued)

*Primary Examiner* — Galen H Hauth
*Assistant Examiner* — John Robitaille
(74) *Attorney, Agent, or Firm* — Leydig, Voit & Mayer, Ltd.

(57) ABSTRACT

An extrusion printer including a print head module is described. The print head module is arranged for cooperating with at least one further print head module in a stackable arrangement to form an extrusion print head. The print head module includes a casing having a first outlet channel defining a first nozzle for printing a first material, and a first inlet for receiving the first material from a first supply line
(Continued)

including a first material supply. The casing defines a first pump chamber connected to the first outlet channel and the first inlet. The module further includes a first gear pump having two meshing gears arranged within the first pump chamber. A first meshing gear of the two meshing gears of the first pump is arranged for being actuated by a first actuator axle that extends through the stackable arrangement.

17 Claims, 9 Drawing Sheets

(56)                     References Cited

U.S. PATENT DOCUMENTS

2014/0159273  A1      6/2014  Koop et al.
2018/0093406  A1*    4/2018  De Bruijn ............. B29C 48/156

FOREIGN PATENT DOCUMENTS

EP            3172038  A1      5/2017
JP          2000127251  A      5/2000
JP          2002512121  A      4/2002
JP          2017528340  A      9/2017

OTHER PUBLICATIONS

Japanese Patent Office, Decision to Grant in corresponding Japanese Application No. 2022-546718 dated Nov. 13, 2025.

* cited by examiner

PRINT HEAD MODULE AND PRINTER

CROSS-REFERENCE TO RELATED APPLICATIONS

This patent application is a U.S. National Phase of PCT International Application No. PCT/NL2021/050064, filed Feb. 3, 2021, which claims priority to European Application No. 20155139.7, filed Feb. 3, 2020, which are both expressly incorporated by reference in their entireties, including any references contained therein.

The invention is directed at a print head module for an extrusion print head, and further to an extrusion printer.

Extrusion printing is a promising, material extrusion type additive manufacturing technique. In extrusion printing, an object is built by selectively depositing material in a predetermined path layer-by-layer. Different types of material may be applied, such as molten polymers or metals, or other liquid building materials. Extrusion printing is also suitable for printing material suspensions, for example for printing food or medicines.

In a range of different fields of application, for example in food or medicine printing as referred to above, printing of objects is performed in large quantities. In particular where objects are small, such as in printing of pills for medicine, a print head with a large density of nozzles is desired. This already is challenging to achieve, because all nozzles need to be operable individually. Additionally, the pressure drops over the supply lines needs to be the same for all nozzles to prevent differences in e.g. the amounts of material printed by each nozzle.

It is an object of the present invention to provide a solution to the above challenges, and to enable providing a fused deposition modeling type print head having a large density of nozzles that are operable to provide a balanced output in terms of amount of printing material.

According to a first aspect of the invention there is provided a print head module. The module being arranged for cooperating with at least one further module in a stackable arrangement such as to form a fused deposition modeling print head. The module comprises a casing. The casing comprises a first outlet channel defining a first nozzle for printing a first material, and a first inlet for receiving the first material. The casing defines a first pump chamber connected to the first outlet channel and the first inlet. The module further comprises a first gear pump comprising two meshing gears arranged within the first pump chamber. A first meshing gear of the two meshing gears of the first pump is arranged for being actuated by a first actuator axle that extends through the stackable arrangement.

The module in accordance with the present invention is a stackable module that may be attached to a further module. This enables to form a print head that comprises a large number nozzles closely spaced together. Furthermore, because the module in accordance with the present invention includes a gear pump of which at least the first gear is arranged for being actuated by a first actuator axle that extends through the stackable arrangement, in a stacked configuration the use of a single actuator axle enables to actuate a plurality of modules. As a result, the present invention enables to be stacked such as to form a print head that comprises a large number of closely spaced nozzles, each nozzle being operable by operating a gear pump using a single actuation axle through the arrangement.

The first inlet may be connected to a first supply line comprising a first material supply pump. Alternatively, material may be received from a reservoir which may be pressurized or may include an additional supply pump. The module may be used to print various types of different material that are suitable for being dispensed through an extrusion 3D printing system.

In accordance with some embodiments, the first gear of the two meshing gears comprises a first through hole extending axially through said first gear. The first through hole is profiled for cooperating with the first actuator axle for the transfer of rotational energy from the first actuator axle to said first gear. The first through hole may to this end rectangular as seen from a direction of stacking. This allows surfaces of axle and the meshing gear to engage for transfer of torque. A benefit is that this allows the simultaneous actuation of a series of modules in the same stack by a single actuator.

The second gear of the two meshing gears may comprise a second through hole. The second through hole could in such a case be profiled for cooperating with a second actuator axle for the transfer of rotational energy from the second actuator axle to said second gear, much like the first through hole. Optionally the second through hole is also rectangular as seen from a direction of stacking. Alternatively, the second through hole can be profiled allowing the second actuator axle to extend there through and is rotatable free from engagement. In this alternative the second through hole is may be circular as seen from a direction of stacking. This beneficially allows the selective activation of different modules in a same stack, such as modules in the stack which do have a second through hole that is rectangular or otherwise arranged for cooperating with the second axle.

Optionally, the first inlet comprises a first inlet valve arranged to assume either one of an open position, wherein the first material, is allowed to pass to the first gear pump, and a closed position, wherein the first material, is prevented from passing to the first gear pump. This beneficially allows a printer to shut a module off from the inlet in case of malfunction, while still being able to print with multiple nozzles simultaneously.

On a further note, the casing may designed as a stackable slat, with a thickness in the range of −0.5-10 mm, defining a first stacking face and a second stacking face opposite the first face, for stacking with the at least one further module, such as, but not necessarily, via a spacer. A benefit is that one can stack the modules to have a specific distance between nozzles. This further allows for easy assembly of a printing head formed by such a stack.

Also according to the first aspect of the invention, the module may comprises a first through hole extending from the first face to the second face defining a supply line extension for the first material to the at least one further module. This allows the supply lines structure to be integral with the modules such as to allow a single supply line to extend through any of the modules to any module. A benefit is ease of maintenance. Optionally the first inlet extends from the first through hole to the first gear pump. Further optionally, the module may comprise a second through hole extending from the first face to the second face defining a supply line extension for the second material, such as to the at least one further module. The second inlet may in addition hereto extend from the first through hole to the second gear pump Optionally, the module comprises an actuatable first diversion valve. The casing comprises a first diversion channel connecting the first outlet channel via the actuatable first diversion valve. The first diversion valve is arranged to assume, in response to a control signal either one of a printing position, wherein the first material, is allowed to pass through the first nozzle for printing, and a diverting position, wherein the first material is diverted from the first nozzle to the first diversion channel. A benefit is that this prevents a flow from stagnating, when the module isn't printing. This also ensures a steady average residence time of any material, which is beneficial to the consistency of medicinal product for example. If residence time isn't an issue for the material, the diversion can be routed to the supply line.

A single module may also be arranged to print using two different nozzles. To this end the casing may comprise a second outlet channel defining a second nozzle for printing a second material and a second inlet for receiving the second material, such as from a second supply line comprising a second material supply pump. The casing may define a second pump chamber connected to the second outlet channel and the second inlet. The module further comprises a second gear pump comprising two meshing gears arranged within the second pump chamber. A first meshing gear of the two meshing gears of the second pump is arranged for being actuated by a third actuator axle that extends through the stackable arrangement. The second meshing gear of the two meshing gears of the second pump is arranged to allow a fourth actuator axle to extend there through to the at least one further module in the stackable arrangement such that the fourth actuator axle remains free from engagement by said second meshing gear when rotating around its longitudinal axis. This increases versatility of product printing and allows the simultaneous actuation of printing in a total of four different materials.

Optionally the module comprises an actuatable second diversion valve, and wherein the casing comprises a second diversion channel connecting to the second outlet channel via the actuatable second diversion valve. The second diversion valve is arranged to assume, in response to a control signal either one of a printing position, wherein the second material, is allowed to pass through the second nozzle for printing; and a diverting position, wherein the second material is diverted from the second nozzle into the second diversion channel. Here too a benefit is that this prevents a flow from stagnating, when the module isn't printing. This also ensures a steady average residence time of any material, which is beneficial to the consistency of medicinal product for example.

The second inlet comprises a second inlet valve arranged to assume either one of an open position, wherein the second material, is allowed to pass to the second gear pump, and a closed position, wherein the second material, is prevented from passing to the second gear pump.

According to a second aspect of the invention there is provided herein a fused deposition modeling printer for printing at least a first material, comprising a stack of modules, wherein each of the modules is a module according to the first aspect of the invention. The printer further comprises a first actuator axle, a first material supply, such as a material holder, and a first material supply line for providing the first material to the first inlet. The first material supply and supply line are connected. The first material supply line optionally comprises a first material supply pump and a controller for controlling at least the first actuator axle. The controller may, depending on the modules comprises in the stacked arrangement, be arranged for controlling at least the first inlet valve and/or for controlling at least the first diversion valve, such as by means of a control signal.

In accordance with a third aspect, there is provided a print head module, the module being arranged for cooperating with at least one further module in a stackable arrangement such as to form an extrusion print head, the module comprising a casing, wherein the casing comprises a first outlet channel for printing a first material, and a first inlet for receiving the first material, wherein the casing defines a first pump chamber connected to the first outlet channel and the first inlet, and wherein the module further comprises a first gear pump comprising two meshing gears arranged within the first pump chamber, wherein a first meshing gear of the two meshing gears of the first pump is arranged for being actuated by a first actuator axle that extends through the stackable arrangement.

In some embodiments, the casing of the print head module further comprises a second outlet channel for printing a second material, and a second inlet for receiving the second material, wherein the casing defines a second pump chamber connected to the second outlet channel and the second inlet, and wherein the module further comprises a second gear pump comprising two meshing gears arranged within the second pump chamber, wherein a first meshing gear of the two meshing gears of the second pump is arranged for being actuated by a third actuator axle that extends through the stackable arrangement.

In some embodiments, the module is configured for, in said stackable arrangement in cooperation with said at least one further module, cooperate with a nozzle plate comprising a plurality of nozzles, for printing said first material via the first outlet, or for printing said first or second material via the first or second outlet through one or more of the nozzles of the nozzle plate. In some embodiments, the first outlet channel, or the first outlet channel or the second outlet channel, includes or is configured for cooperating with at least one nozzle for printing of the first or second material.

BRIEF DESCRIPTION OF THE DRAWINGS

The aspects of the invention will further be elucidated in the following Figures.

DETAILED DESCRIPTION

Figure 1:
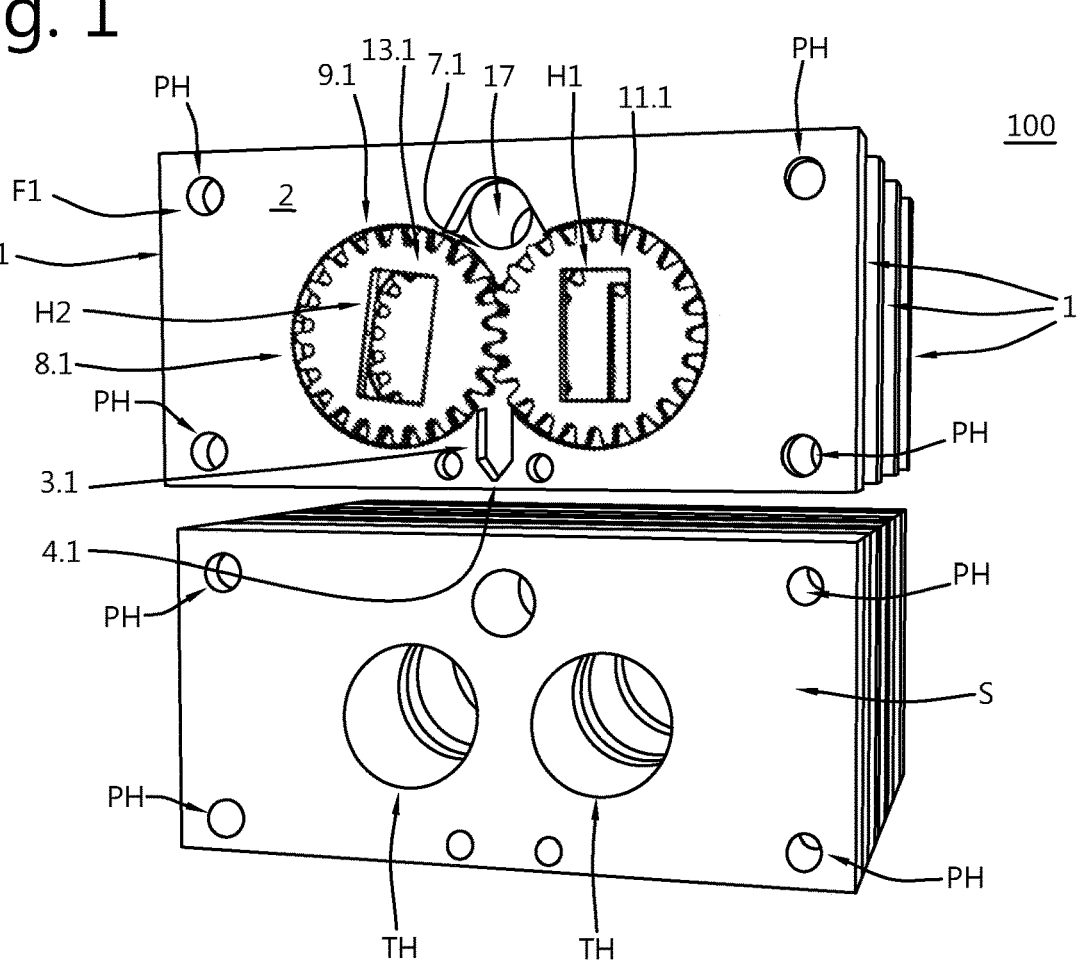
FIG. 1 shows a print head module in a stackable arrangement in accordance with an embodiment.

FIG. 1 shows a print head module 1 in a stackable arrangement 100. The module 1 is arranged for cooperating with further such modules in the stackable arrangement 100 in order to form a fused deposition modeling print head. All parts of the module are furnished within a thin slat casing with a thickness of 0.5-10 mm. The casing 2 has an outlet channel 3.1 that defines a nozzle 4.1 for printing a first material 5.1. Additionally, the casing 2 has an inlet 7.1 for receiving the first material from a supply line 17 the inlet extends to a pump chamber 8.1 which is also defined within the casing. The pump chamber 8.1 also connects to the outlet channel 3.1 and holds two meshing gears 11.1 and 13.1. The first of these meshing gears is arranged for being actuated by a first actuator axle 15.1 that extends through the stackable arrangement. This can best be seen in FIG. 2. This allows a plurality of modules in the stack to be actuated simultaneously, which is advantageous for printing a multiplicity of same products at once. What can further be seen in FIG. 1 is that the casing has a first face F1 and a second face F2 opposite the first face. Additionally, the modules are spaced from subsequent modules in the stack by means of a spacer S, which allows the module to be fluidly sealed from the environment save for through the inlet for receiving material, and an outlet for depositing material. A spacer is in this sense a cover to any of the faces of the casing. The stacking of modules would in this example follow an alternating pattern of module 1 and spacer S, in which the sequence may begin and end with a spacer, but the sequence could also begin or end with any other kind of cover. The modules have pin holes PH which extend from the first face to the second face of the module each for receiving a locking pin therein for connecting a plurality for modules together in line. The spacers may to this end also have pin holes such as to be a stacked together in line with the modules. Additionally, for each actuator axle there is provided a through hole TH which allows the free rotation around the longitudinal axis of such an axle within the spacer. In FIG. 1 there are two through holes shown, but this can also be one, three, four or any plurality corresponding to the number of axles used in a printing head.

Figure 2:
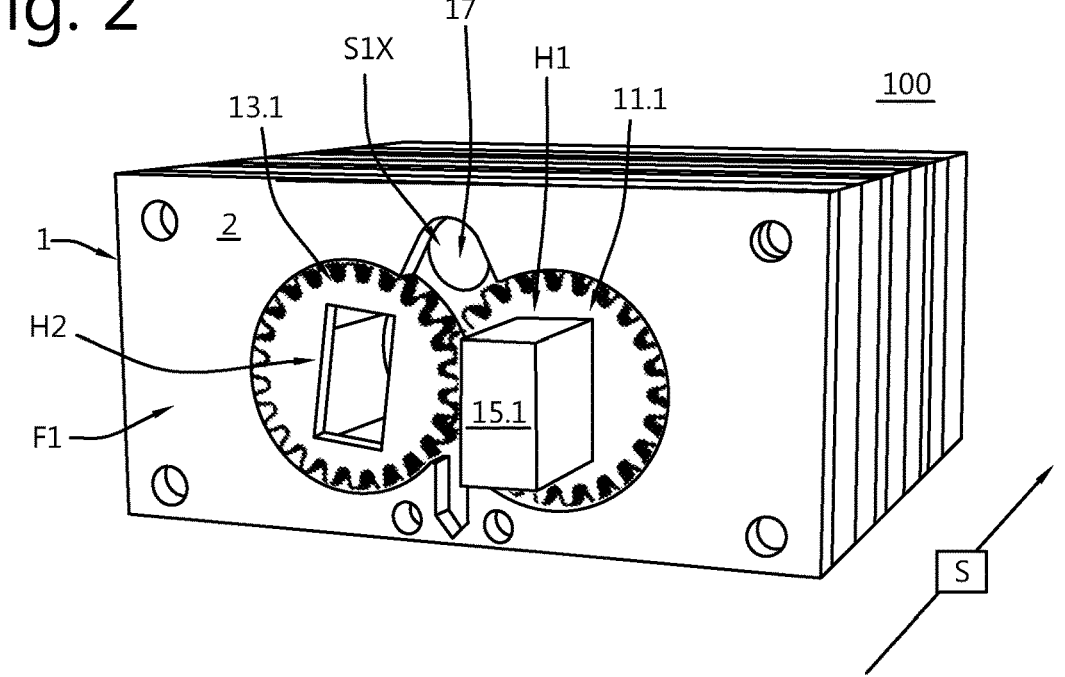
FIG. 2 shows an arrangement of stacked print head modules in accordance with an embodiment.

In FIG. 2 it can be seen that the gear of the two meshing gears 11.1 comprises a through hole H1 extending axially through said first gear from the first face to the second face of the casing. The through hole H1 is profiled for cooperating with the actuator axle 15.1 for the transfer of rotational energy from the actuator axle to the first gear 11.1. In this example the actuator axle 15.1 has a rectangular frontal plane cross section which matches the profile of the through hole H1 as seen from a direction of stacking S. The first gear 11.1 thus has a through hole is H1 profiled for cooperating with the first actuator axle 15.1 for the transfer of rotational energy from the first actuator axle to said first gear. In this example the second gear 13.1 of the two meshing gears has a second through hole H2 profiled for cooperating with a second actuator axle 15.2 for the transfer of rotational energy from the second actuator axle to said second gear. In this example too, the through hole is rectangular as seen from the direction of stacking S. This second actuator axle however does not need to be present to allow both meshing gears to become actuated since either of the meshing gears may actuate the other. However, a module as shown in FIG. 2 may be co-actuated by two actuator axles. Optionally, one of the meshing gears is larger than the other which would, in a two-axle arrangement, allow a torque to be selected by selecting the axle by which the module is actuated. The module 1 also has a first through hole 17 extending from the first face F1 to the second face F2 defining a supply line extension S1X for the first material to the at least one further module. The supply line may also extend through any spacer elements. In this example the inlet extends from the first through hole, which acts as a part of the supply line, to the gear pump, more specifically the pump chamber.

Figure 3:
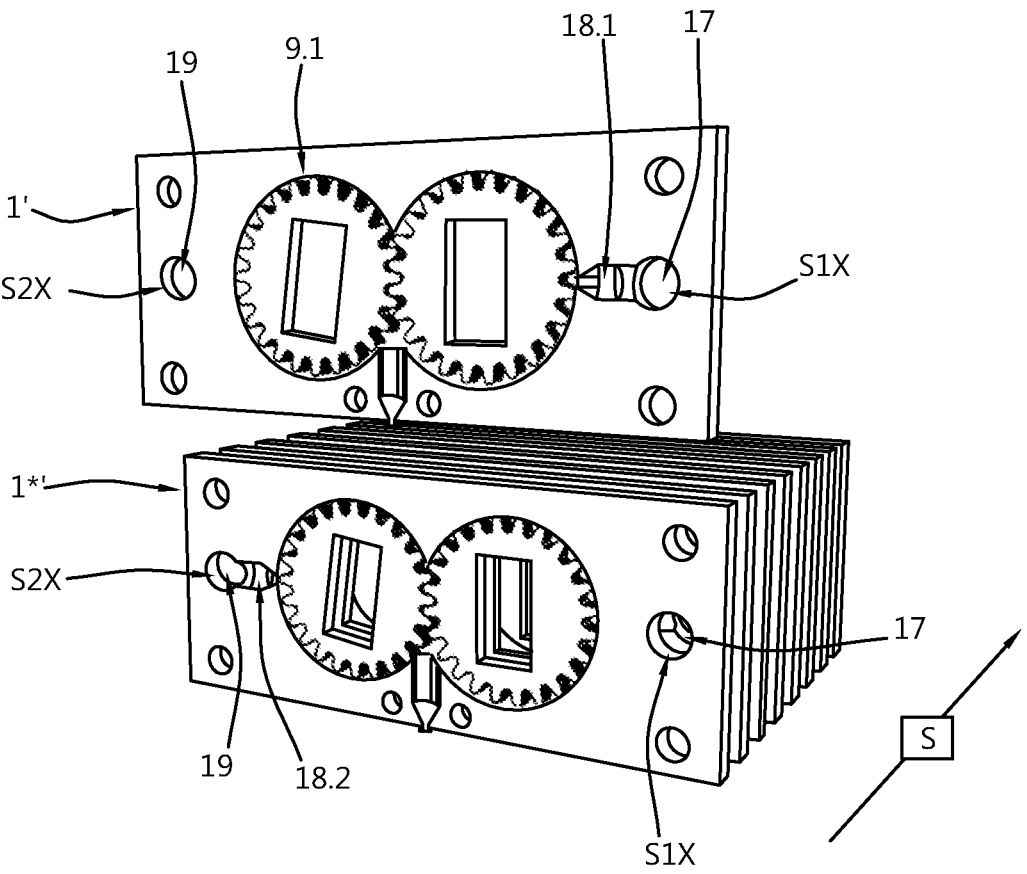
FIG. 3 shows a module in accordance with an embodiment.

In FIG. 3 another alternative module 1' is shown. In this Figure only differences will be discussed with respect to the module 1 as shown in FIG. 2. Common features between both FIGS. 2 and 3 will be provided with the same reference numbers. The module 1' has a second through hole 19 extending from the first face F1 to the second face F2 defining a supply line extension S2X for a second material, such as to the at least one further module. The second supply line may also extend through any spacer elements S. In this example the at least one further module **1\*' has an inlet that extends from the second through hole 19, which acts as a part of the second supply line, to the gear pump, more specifically the pump chamber. This allows printing of multiple different materials using the same printing head. In this example the printing of either material is controlled by means of a first inlet valve 18.1. The first inlet has a first inlet valve arranged to assume either one of an open position, wherein the first material, is allowed to pass to the first gear pump 9.1 and a closed position, wherein the first material, is prevented from passing to the first gear pump. The at least one further module 1\*' is in this regard a mirror image of the module 1' in that it also has an inlet valve 18.2**, but one controlling the inlet flow of a second material. An inlet valve may be present in any inlet of any module of any embodiment for the specific control over the supply of any specific material to the gear pump to which said inlet is arranged to supply material.

Figure 4:
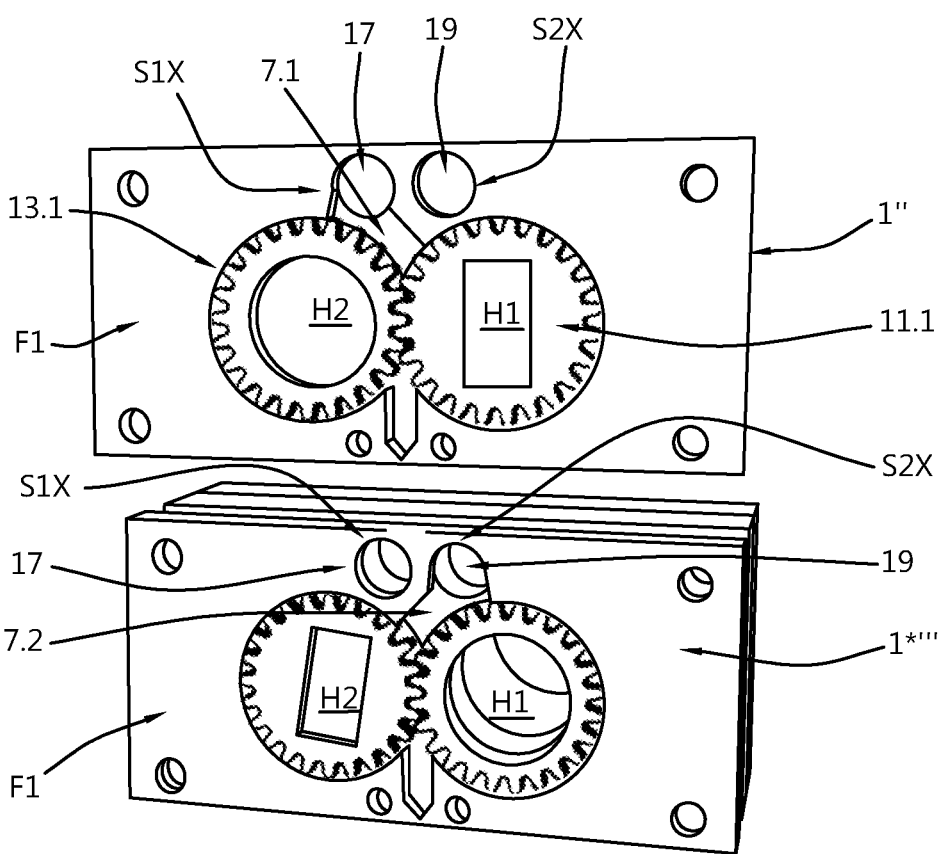
FIG. 4 shows a module in accordance with an embodiment.
Figure 5:
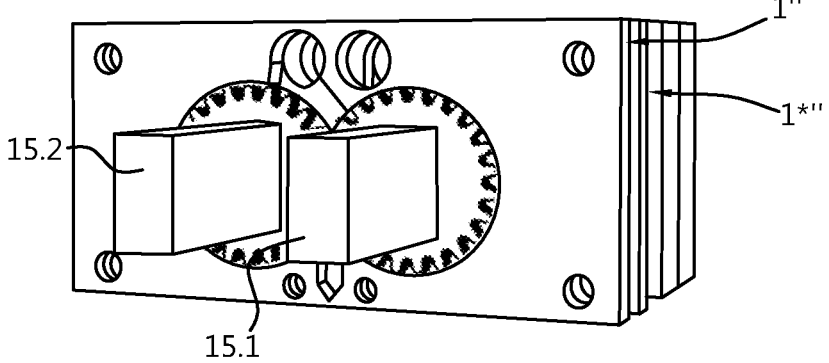
FIG. 5 shows a stacked arrangement of modules in accordance with an embodiment.

In FIG. 4 an alternative module 1" is shown. In this Figure only differences will be discussed with respect to the module 1' as shown in FIG. 3. Common features between both FIGS. 4 and 3 will be provided with the same reference numbers. In this example no spacers S are shown, but these may also be present in an alternating setup with the modules. The module 1" is designed such that the pump chamber is fluidly sealed from another module when the module 1" is stacked directly with that other module such that the second face F2 of that other module is stacked on the first face F1 of the module 1". A first module in the stack may be provided with a cover, such as a spacer S, such that its pump chamber is fluidly sealed from other modules as well. It can be seen in FIG. 4 that the second through hole H2 is now profiled allowing the second actuator axle 15.2 to extend there through and is rotatable free from engagement. More specifically, the second through hole is circular as seen from the direction of stacking S. The module has a second through hole 19 extending from the first face F1 to the second face F2 defining a supply line extension S2X for a second material, such as to the at least one further module. In this configuration, inlet 7.1 is fed with a first material via through hole 17 and supply line extension S1X, and inlet 7.2 is fed with the second material via through hole 19 and supply line extension S2X. In this example the mirror image **1\*" of the module 1 may be provided in a same stack of modules. This allows the module 1" to be actuated by a first actuator axle for printing a first material, and the mirror image 1\*" module to be actuated by the second axle for printing a second material. It is noted here that the mirror image module 1\*" can be, but doesn't need to be an exact mirror image. The mirror image module 1\*" can be any module in which the through hole H2 is profiled such that the second gear 13.1** can be actuated by the second axle, and wherein the first through hole H1 is profiled such that it is prevented from being actuated by the first axle. Additionally, the inlet has to be arranged to receive a second material. FIG. 5 shows the module 1" and mirror image module **1*'''** are stacked together.

Figure 6:
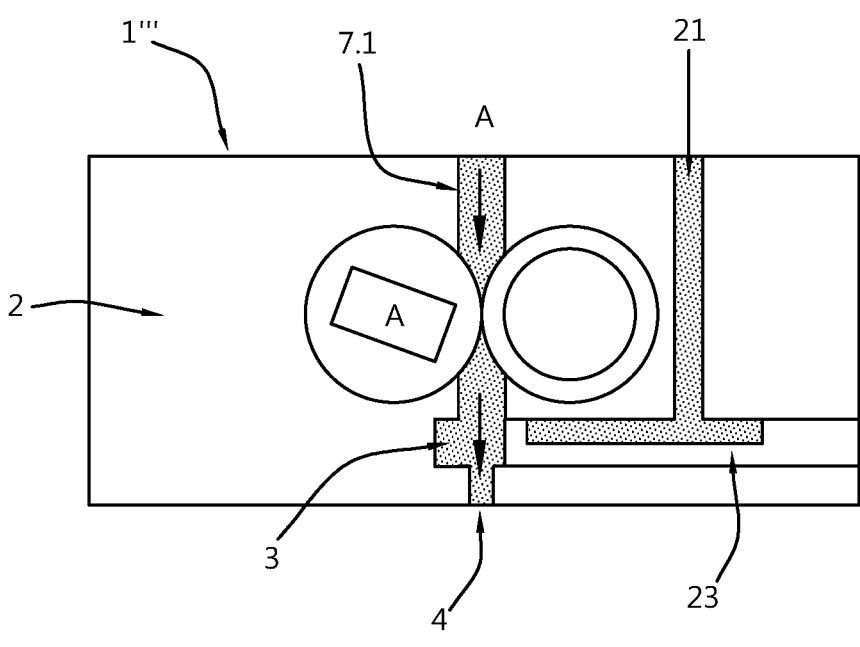
FIG. 6 shows a module in accordance with an embodiment.
Figure 6:
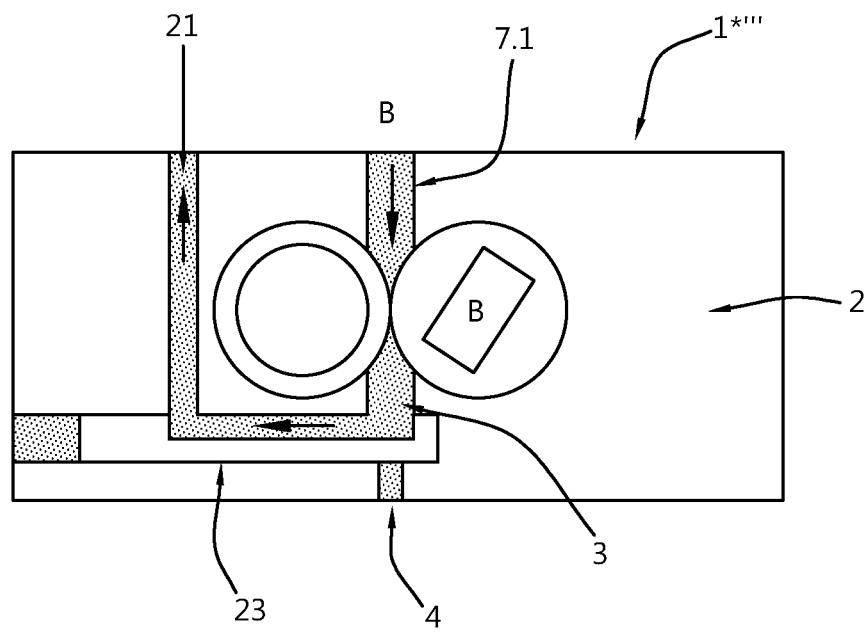

In FIG. 6 an alternative module 1''' is shown. In this Figure only differences will be discussed with respect to the module 1" as shown in FIG. 4. Common features between both FIGS. 6 and 4 will be provided with the same reference numbers. In this example the module 1''' is arranged for receiving a first material A via the first, and in this example only, inlet 7.1. the module has an actuatable first diversion valve 23 and the casing 2 has a first diversion channel 21 connecting the first outlet channel 3 via the actuatable first diversion valve 23. In FIG. 6 the diversion valve has assumed a printing position in which the first material, is allowed to pass through the first nozzle 4 for printing. However, the valve may alternatively also be controlled to assume a diverting position, in which the first material is diverted from the first nozzle to the first diversion channel 21. The module optionally also has a mirror image counter part **1*'''' with which the module 1''' can be stacked. In this example the mirror image counterpart module 1*'''' is arranged for receiving a second material B via the first, and in this example only, inlet 7.1. In FIG. 6 the counter part 1*'''' also has a diversion valve. The diversion valve has, as a manner of example, assumed a diversion position in which a second material B, is diverted from the first nozzle to the first diversion channel 21. However, the valve may alternatively also be controlled to assume a printing position, in which the second material is allowed to pass through the first nozzle 4** for printing.

When stacked together the counter part **1*'''' is able to be actuated by the second actuator axle only, while the module 1'''** is actuatable by the first actuator axle only or vice versa. This allows the controlled printing of two different materials by a same printing head using a stack of such modules.

Figure 7:
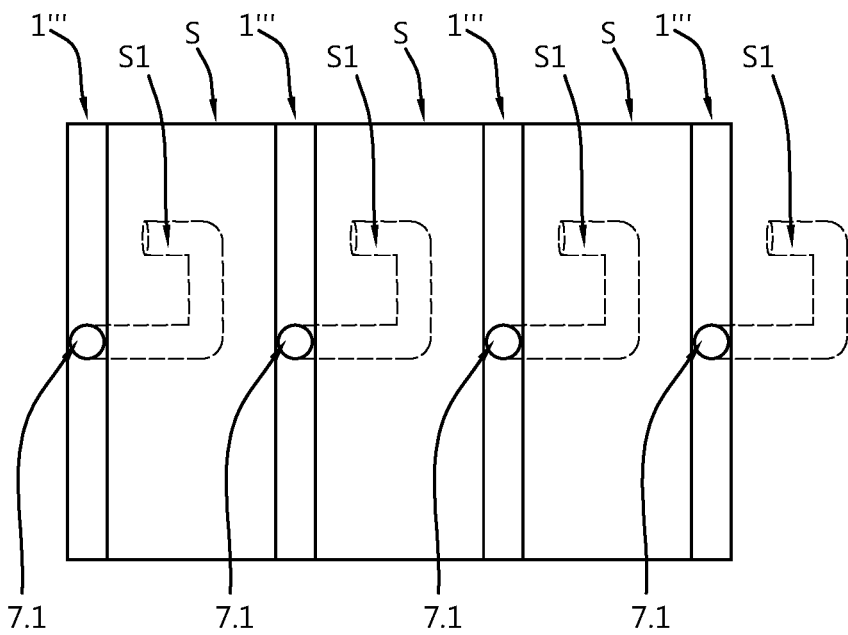
FIG. 7 shows a stack of modules spaced apart by spacers in accordance with an embodiment.

FIG. 7 shows a stack of modules 1''' of FIG. 6 spaced apart by spacers. Each of the modules is in this example supplied a material separately. This material may differ from module to module depending on the intended printed product. However, in this example all modules are fed via a first material supply line S1.

Figure 8:
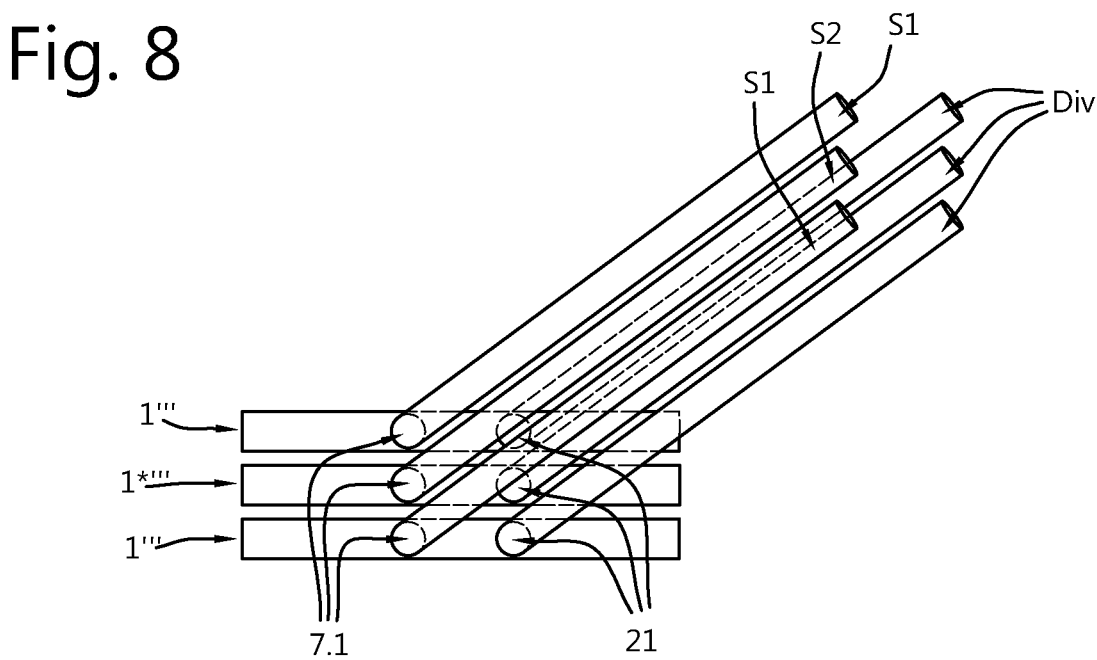
FIG. 8 shows a stack of modules and counter part modules stacked together without spacers.

FIG. 8 shows a stack of modules 1''' and counter part **1*'''' modules of FIG. 6 stacked together without spacers. Each of the modules and counterpart modules is in this example supplied a material separately. In this example the modules 1''' are supplied a first material via a first material supply line S1, and the counterpart modules 1*''''** are supplied a second material, different from the first material, via a second material supply line S2. Any diverted materials are separately transported through diversion pipelines Div.

Figure 9:
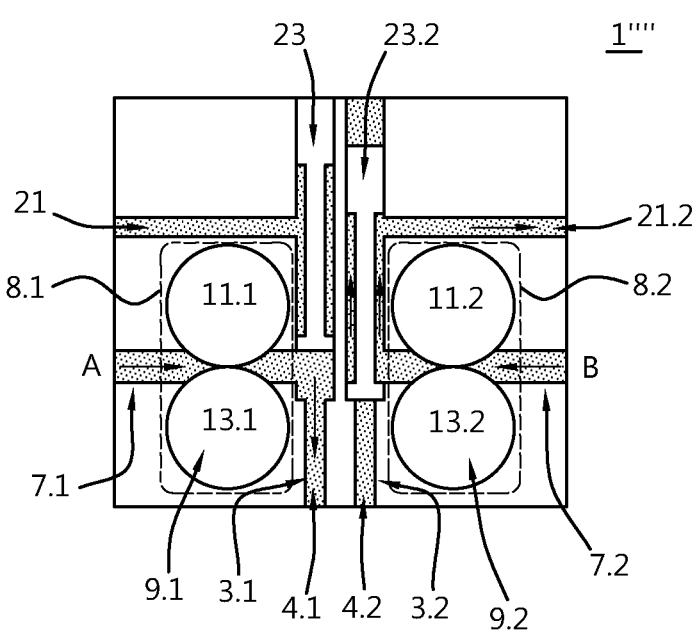
FIG. 9 shows an alternative module in accordance with an embodiment.

In FIG. 9 an alternative module 1''' is shown. In this Figure only differences will be discussed with respect to the module 1''' as shown in FIG. 6. Common features between both FIGS. 9 and 6 will be provided with the same reference numbers. In this example the casing 2 has a first 3.1 and second outlet channel 3.2. The first outlet channel defines a first nozzle 4.1 for printing a first material A. The second outlet channel defines a second nozzle 4.2 for printing a second material B. In this example the module has a first inlet 7.1 for receiving the first material A and a second inlet 7.2 for receiving the second material B. The casing defines a first pump chamber 8.1 and a second pump chamber 8.2. The first pump chamber is connected to the first outlet channel and the first inlet, and the second pump chamber is connected to the second outlet channel and the second inlet. The module has a first gear pump 9.1 arranged in the first pump chamber 8.1, and a second gear pump 9.2 arranged in the second pump chamber 8.2. Much like the first gear pump the second gear pump has two meshing gears 11.2 and 13.2. In this example each of the gear pumps can be actuated by a mutually different actuator axle.

The module has an actuatable second diversion valve 23.2, wherein the casing 2 has a second diversion channel 21.2 fluidly connecting to the second outlet channel 3.2 via the actuatable second diversion valve 23.2. The second diversion valve 23.2 is arranged to assume, a printing position, wherein the second material, is allowed to pass through the second nozzle 4.2 for printing and a diverting position, wherein the second material is diverted from the second nozzle 4.2 into the second diversion channel 21.2. In this example the diversion valve 23 is shown to be in the printing position, and the second diversion valve is shown in the diverting position.

Not shown here, but also optional is the presence of an inlet valve in each of the inlets. For example, the second inlet may have a second inlet valve arranged to assume either one of an open position, wherein the second material, or fourth material in the case of FIG. 10B, is allowed to pass to the second gear pump, and a closed position, wherein the second, or fourth, material, is prevented from passing to the second gear pump 9.2.

Figure 10A:
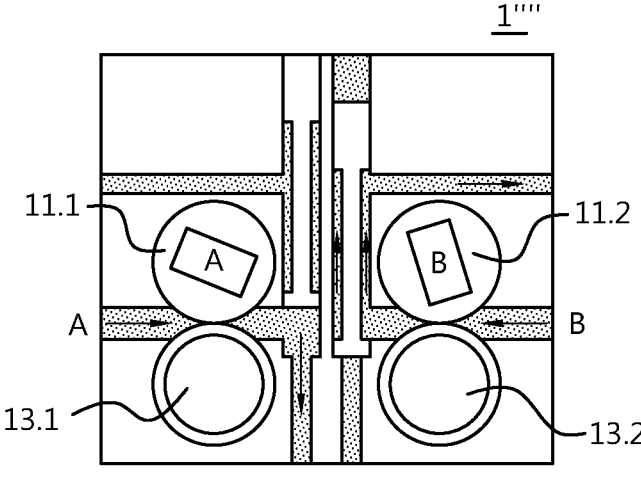
FIGS. 10A and 10B show a module in accordance with an embodiment.

In FIG. 10A it is more specifically shown that the module 1'''' can be arranged such that a first meshing gear 11.1 of the two meshing gears of the first pump 9.1 is arranged for being actuated by a first actuator axle 15.1 that extends through the stackable arrangement. The first meshing gear has a through hole that is profiled for cooperating with the first actuator axle 15.1 It can further be seen in FIG. 10A that the second meshing gear 13.1 of the two meshing gears of the first pump 9.1 has a through hole that is profiled for allowing a second actuator axle 15.2 to extend there through, such that it is rotatable free from engagement. The first meshing gear 11.2 of the two meshing gears of the second pump 9.2 is arranged for being actuated by a third actuator axle that extends through the stackable arrangement. The first meshing gear 11.2 has a through hole that is profiled for cooperating with the third actuator axle. It can further be seen in FIG. 10A that the second meshing gear 13.2 of the two meshing gears of the second pump 9.2 has a through hole that is profiled for allowing a fourth actuator axle 15.2 to extend there through, such that it is rotatable free from engagement.

Figure 10B:
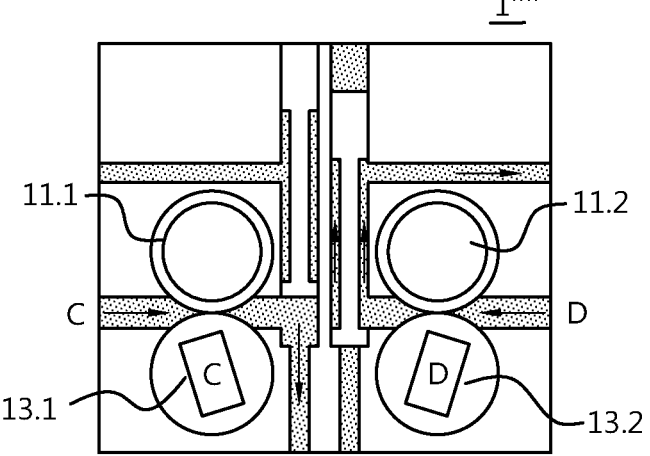

In FIG. 10B it is more specifically shown that the module 1'''' can be arranged such that a second meshing gear 13.1 of the two meshing gears of the first pump 9.1 is arranged for being actuated by the second actuator axle 15.2 that extends through the stackable arrangement. The second meshing gear 13.1 has a through hole that is profiled for cooperating with the second actuator axle 15.2 It can further be seen in FIG. 10B that the first meshing gear 11.1 of the two meshing gears of the first pump 9.1 has a through hole that is profiled for allowing the first actuator axle 15.1 to extend there through, such that it is rotatable free from engagement. The second meshing gear 13.2 of the two meshing gears of the second pump 9.2 is arranged for being actuated by a fourth actuator axle that extends through the stackable arrangement. The second meshing gear 13.2 has a through hole that is profiled for cooperating with the fourth actuator axle. It can further be seen in FIG. 10B that the first meshing gear 11.2 of the two meshing gears of the second pump 9.2 has a through hole that is profiled for allowing the third actuator axle to extend there through, such that it is rotatable free from engagement. In the example of FIG. 10B the first inlet instead receives a third material C and the second inlet receives a fourth material D. When the module of FIG. 10A and the module of FIG. 10B are stacked together the stack will be able to control the printing of four different materials. As an alternative to the above embodiments in FIGS. 9 and 10, the modules may likewise be designed such that the inlets 7.1 and 7.2 provide access to a common pump chamber 8.1, which provides access to a single outlet 3.1 and nozzle 4.1.

Figure 11:
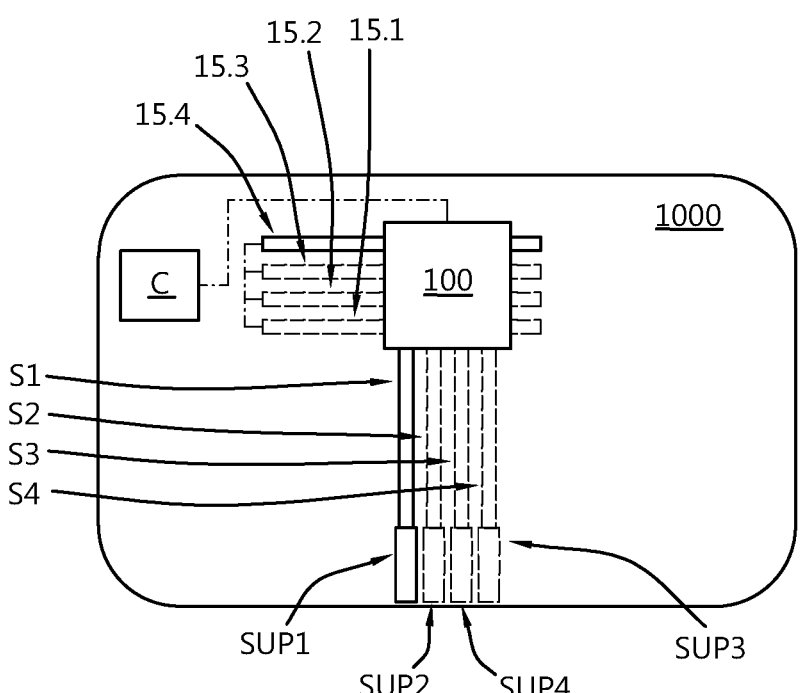
FIG. 11 shows a module in accordance with an embodiment.

In FIG. 11 it can be seen that any of the above described modules, as far as they are compatible, can be stacked in arrangement 100 such as to form a printing head. A 3D extrusion printer 1000 can the be equipped with a first actuator axle 15.1 optionally in combination with a second actuator axle 15.2, and possibly additionally a third 15.3 and a fourth actuator axle 15.4. Each axle may be controlled by a printer controller C. Similarly, the printer may have a first material supply SUP1, such as a reservoir of fluid material and optionally a pump. Optionally also have a second material supply SUP2, and even further optionally a third a fourth material supply SUP3, SUP4. Each of these supplies also having a mutually fluid material reservoir and optionally a separate pump means. Optional elements are shown with a dashed line ---- and depend on the particular modules comprises in the stacked arrangement 100. In this example the printer has a first material supply line S1 for providing the first material to the first inlet, wherein the first material supply line optionally comprises a first material supply pump instead of the supply SUP1. Optionally, a second material supply line S2 is also present, and further optionally a third and fourth material supply line S3, S4, depending on the particular modules comprised within the stacked arrangement. In this example the S1-S4 are shown as singular supply lines, however each of these supply lines S1-S4 can represent a plurality of supply lines such as shown in FIGS. 7 and 8. To this end a supply line may be split into a plurality of supply lines of the same material. Each of the supply lines may also extend through the stack of modules by modular extension as can be seen from S1X, S2X in FIG. 4 as well as FIGS. 1 and 2. The controller C may also be arranged for controlling any inlet valve of each of the modules in the stacked arrangement. In FIG. 11 diversion channels are not shown, however, these may also be present depending on the modules comprised in the stacked arrangement. In the example in which the modules forming the stacked arrangement comprise a diversion channel and valve, such as the modules as shown in FIGS. 6, 7, 8, 9, 10A and 10B the controller C may also be arranged for controlling at the diversion valves present in each module, such as by means of a control signal.

Figure 12A:
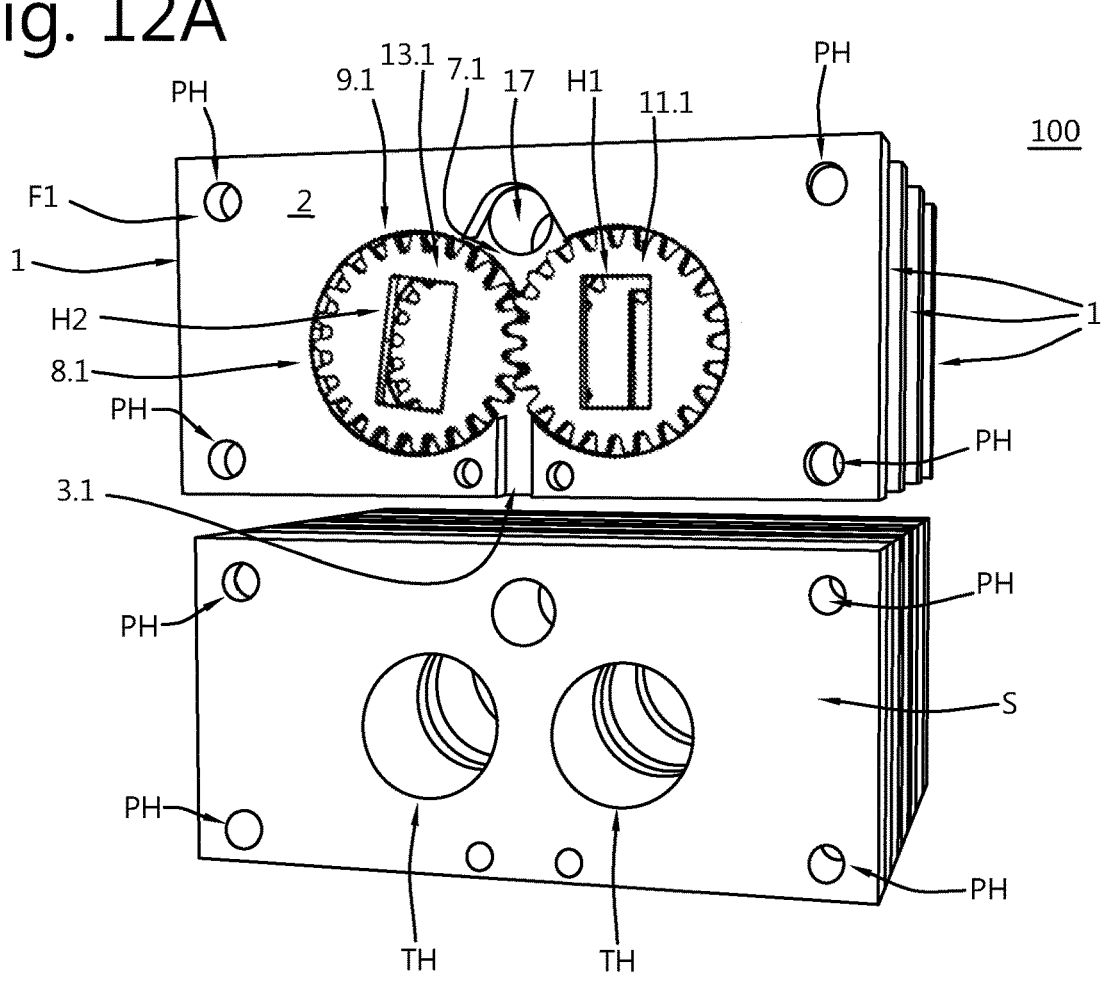
FIGS. 12A and 12B schematically illustrate a further embodiment of the present invention, including a nozzle plate for use therewith.
Figure 12B:
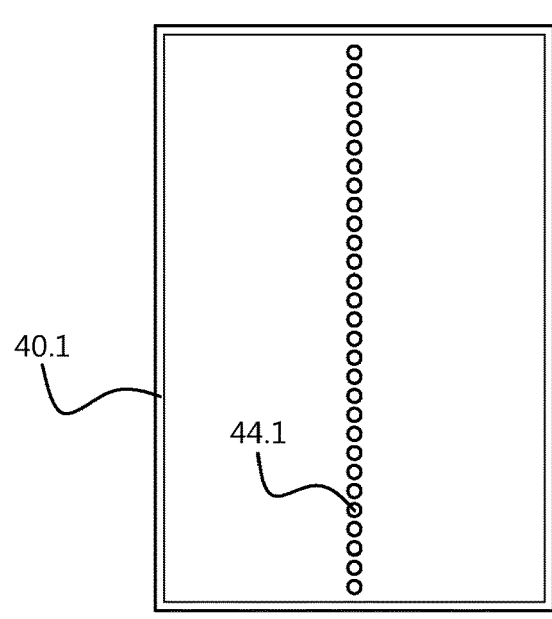

FIG. 12A shows an alternative print head module 1 in a stackable arrangement 200. The module of FIG. 12A has a lot of similarities with the module illustrated in FIG. 1, but with some differences. In particular, the module 1 of FIG. 12A is configured for cooperating, in a stackable arrangement 200 with other modules, with a nozzle plate 40.1 comprising a plurality of nozzles 44.1. The nozzle plate 40.1 is for example illustrated in FIG. 12B in top view, looking at the inward face which in use is contiguous to the outlets 3.1 of the modules 1. The module 1 is arranged for cooperating with further such modules in the stackable arrangement 200 in order to form a fused deposition modeling print head. All parts of the module are furnished within a thin slat casing with a thickness of 0.5-10 mm. The casing 2 has an outlet channel 3.1 for printing a first material 5.1 through one of the plurality of nozzles 44.1 of the nozzle plate 40.1.

Additionally, the casing 2 has an inlet 7.1 for receiving the first material from a supply line 17 the inlet extends to a pump chamber 8.1 which is also defined within the casing. The pump chamber 8.1 also connects to the outlet channel 3.1 and holds two meshing gears 11.1 and 13.1. The first of these meshing gears is arranged for being for being actuated by a first actuator axle 15.1 that extends through the stackable arrangement, similar to the embodiment shown in FIG. 2. This allows a plurality of modules in the stack to be actuated simultaneously, which is advantageous for printing a multiplicity of same products at once. What can further be seen in FIG. 12A is that the casing 2 has a first face F1 and a second face F2 opposite the first face. Additionally, the modules are spaced from subsequent modules in the stack by means of spacers S, which allow the module to be fluidly sealed from the environment save for through the inlet for receiving material, and an outlet for depositing material. A spacer is in this sense a cover to any of the faces of the casing. The stacking of modules would in this example follow an alternating pattern of module 1 and spacer S, in which the sequence may begin and end with a spacer, but the sequence could also begin or end with any other kind of cover. The modules have pin holes PH which extend from the first face to the second face of the module 1 each for receiving a locking pin therein for connecting a plurality for modules together in line. The spacers S may to this end also have pin holes such as to be a stacked together in line with the modules. Additionally, for each actuator axle there is provided a through hole TH which allows the free rotation around the longitudinal axis of such an axle within the spacer. In FIG. 12A there are two through holes shown, but this can also be one, three, four or any plurality corresponding to the number of axles used in a printing head.

Figure 13A:
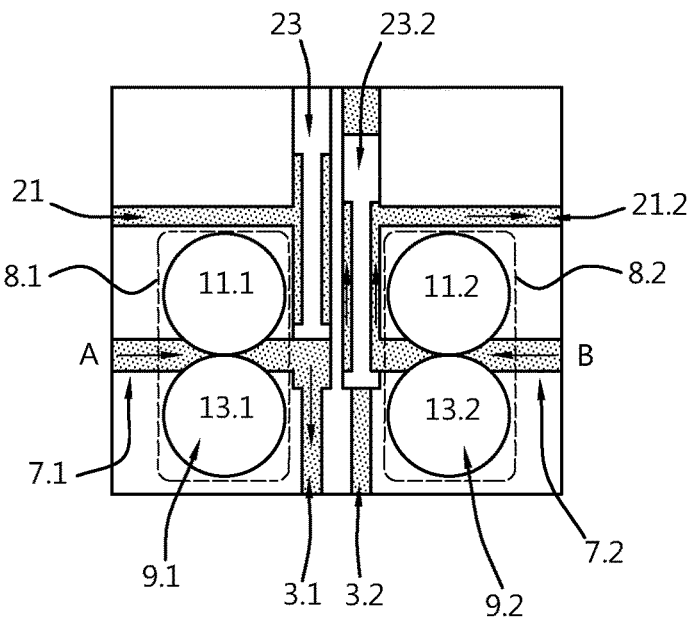
FIGS. 13A, 13B and 13C schematically illustrate a further embodiment of the present invention, including various alternative nozzle plates for use therewith.
Figure 13B:
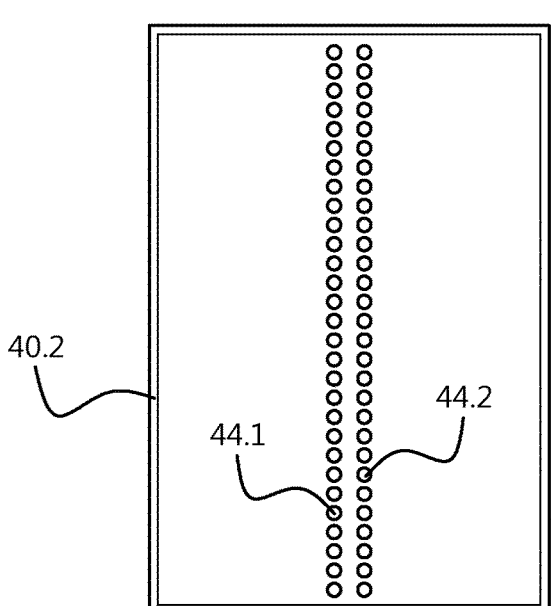

FIGS. 13A and 13B show another embodiment. In FIG. 13A, an alternative module is shown which is configured for cooperating with a nozzle plate 40.2 of FIG. 13B. Common features between FIGS. 13A and 13B and other figures will be provided with same reference numbers. In this example the casing 2 has a first 3.1 and second outlet channel 3.2. The first and second outlet channels 3.1 and 3.2 cooperate respectively with nozzles 44.1 and 44.2 of nozzle plate 40.2 illustrated in FIG. 13B. In this example the module has a first inlet 7.1 for receiving the first material A and a second inlet 7.2 for receiving the second material B. The casing defines a first pump chamber 8.1 and a second pump chamber 8.2. The first pump chamber 8.1 is connected to the first outlet channel 3.1 and the first inlet 7.1, and the second pump chamber 8.2 is connected to the second outlet channel 3.2 and the second inlet 7.2. The module has a first gear pump 9.1 arranged in the first pump chamber 8.1, and a second gear pump 9.2 arranged in the second pump chamber 8.2. Much like the first gear pump the second gear pump has two meshing gears 11.2 and 13.2. In this example each of the gear pumps can be actuated by a mutually different actuator axle.

The module may have an actuatable second diversion valve 23.2, wherein the casing 2 has a second diversion channel 21.2 fluidly connecting to the second outlet channel 3.2 via the actuatable second diversion valve 23.2. The second diversion valve 23.2 is arranged to assume, a printing position, wherein the second material, is allowed to pass through the second nozzle 44.2 for printing and a diverting position, wherein the second material is diverted from the second nozzle 44.2 into the second diversion channel 21.2. In this example the diversion valve 23 is shown to be in the printing position, and the second diversion valve is shown in the diverting position.

Not shown here, but also optional is the presence of an inlet valve in each of the inlets. For example, the second inlet may have a second inlet valve arranged to assume either one of an open position, wherein the second material, or a fourth material, may be allowed to pass to the second gear pump 9.2, and a closed position, wherein the second or fourth material is prevented from passing to the second gear pump 9.2.

Figure 13C:
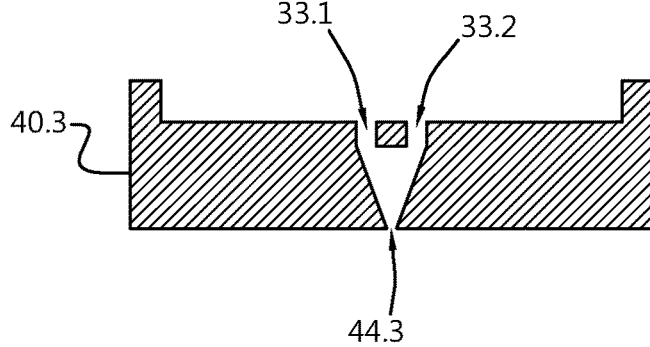

FIG. 13C illustrates a cross section of an alternative nozzle plate 40.3 that may be used in combination with the modules of FIG. 13A discussed above. The nozzle plate 40.3 comprises two nozzle inlets 33.1 and 33.2 cooperating with the outlets 3.1 and 3.2 respectively of the modules of FIG. 13A. The nozzle inlets 33.1 and 33.2 provide access to a common nozzle 44.3 and thereby enable to print each of the materials A and B via the same nozzle 44.3 on the same spot. Alternative embodiments similar to the nozzle plate 40.3 can be thought of, for example wherein the nozzle inlets 33.1 and 33.2 do not provide access to a common nozzle 44.3, but provide access to separate nozzles such as 44.1 and 44.2 which may be directed towards each other to converge in the same spot during printing. Such solutions may likewise be applied to all of the nozzles 4.i discussed above in relation to the other embodiments.

The invention claimed is:

1. A print head module, the module being arranged for cooperating with at least one further module in a stackable arrangement forming an extrusion print head, the module comprising:
   a casing comprising:
      a first outlet channel defining a first nozzle for printing a first material, and
      a first inlet for receiving the first material,
      wherein the casing defines a first pump chamber connected to the first outlet channel and the first inlet; and
   a first gear pump comprising two meshing gears arranged within the first pump chamber,
   wherein a first meshing gear of the two meshing gears of the first pump is arranged for being actuated by a first actuator axle that extends through the stackable arrangement,
   wherein the first meshing gear comprises a first through hole extending axially through the first meshing gear, wherein the first through hole is profiled for cooperating with the first actuator axle for transferring rotational energy from the first actuator axle to the first meshing gear, and
   wherein a second meshing gear of the two meshing gears comprises a second through hole, wherein the second through hole is profiled to allow a rotatably driven second actuator axle to extend there through while remaining rotatable free from engagement with the second meshing gear.

2. The print head module according to claim 1, wherein the first inlet comprises a first inlet valve arranged to assume either one of:
   an open position, wherein the first material, is allowed to pass to the first gear pump; and
   a closed position, wherein the first material, is prevented from passing to the first gear pump.

3. The print head module according to claim 1, wherein the casing is designed as a stackable slat, with the casing having a thickness in the range of 0.5-10 mm, defining a first stacking face and a second stacking face opposite the first stacking face, for stacking with the at least one further module.

4. The print head module according to claim 3, comprising a first through hole extending from the first stacking face to the second stacking face and defining a supply line extension for the first material to the at least one further module.

5. The print head module according to claim 4, comprising a second through hole extending from the first stacking face to the second stacking face and defining a supply line extension for a second material.

6. The print head module according to claim 1, comprising an actuatable first diversion valve,
   wherein the casing comprises a first diversion channel connecting the first outlet channel via the actuatable first diversion valve,
   wherein the first diversion valve is arranged to assume, in response to a control signal, either one of:
      a printing position, wherein the first material, is allowed to pass through the first nozzle for printing; and
      a diverting position, wherein the first material is diverted from the first nozzle to the first diversion channel.

7. The print head module according to at least claim 6, wherein the casing comprises:
   a second outlet channel defining a second nozzle for printing a second material; and
   a second inlet for receiving the second material,
   wherein the casing defines a second pump chamber connected to the second outlet channel and the second inlet, and
   wherein the print head module further comprises:
      a second gear pump comprising two meshing gears arranged within the second pump chamber,
      wherein a first meshing gear of the two meshing gears of the second pump is arranged for being actuated by a third actuator axle that extends through the stackable arrangement, and
      wherein a second meshing gear of the two meshing gears of the second pump is arranged to allow a fourth actuator axle to extend there through to the at least one further module in the stackable arrangement such that the fourth actuator axle remains free from engagement by the second meshing gear of the second pump when rotating around a longitudinal axis of the second meshing gear of the second pump.

8. The print head module according to claim 7, comprising an actuatable second diversion valve,
   wherein the casing comprises a second diversion channel connecting to the second outlet channel via the actuatable second diversion valve,
   wherein the second diversion valve is arranged to assume, in response to a control signal either one of:
      a printing position, wherein the second material, is allowed to pass through the second nozzle for printing; and
      a diverting position, wherein the second material is diverted from the second nozzle into the second diversion channel.

9. The print head module according to claim 7, wherein the second inlet comprises a second inlet valve arranged to assume either one of:
   an open position, wherein the second material, is allowed to pass to the second gear pump; and
   a closed position, wherein the second material, is prevented from passing to the second gear pump.

10. A print head module, the module being arranged for cooperating with at least one further module in a stackable arrangement forming an extrusion print head, the module comprising:

a casing comprising:

a first outlet channel for printing a first material, and a first inlet for receiving the first material, wherein the casing defines a first pump chamber connected to the first outlet channel and the first inlet; and a first gear pump comprising two meshing gears arranged within the first pump chamber, wherein a first meshing gear of the two meshing gears of the first pump is arranged for being actuated by a first actuator axle that extends through the stackable arrangement, wherein the first meshing gear comprises a first through hole extending axially through the first meshing gear, wherein the first through hole is profiled for cooperating with the first actuator axle for transferring rotational energy from the first actuator axle to the first meshing gear, and wherein a second meshing gear of the two meshing gears comprises a second through hole, wherein the second through hole is profiled to allow a rotatably driven second actuator axle to extend there through while remaining rotatable free from engagement with the second meshing gear.

11. The print head module according to claim 10, wherein the casing further comprises:

a second outlet channel for printing a second material, and a second inlet for receiving the second material, wherein the casing defines a second pump chamber connected to the second outlet channel and the second inlet, and wherein the print head module further comprises:

a second gear pump comprising two meshing gears arranged within the second pump chamber, wherein a first meshing gear of the two meshing gears of the second pump is arranged for being actuated by a third actuator axle that extends through the stackable arrangement.

12. The print head module according to claim 10, wherein the module is configured for, in the stackable arrangement in cooperation with the at least one further module, cooperating with a nozzle plate comprising a plurality of nozzles, for printing the first material via the first outlet.

13. The print head module according to claim 10, wherein the first outlet channel includes or is configured for cooperating with at least one nozzle for printing of the first material.

14. An extrusion printer for printing at least a first material, comprising:

a stack of modules, wherein each of the modules is a module according to claim 10;

the first actuator axle;

the first material supply;

the first material supply line for providing the first material to the first inlet, wherein the first material supply line optionally comprises a first material supply pump; and a controller for controlling at least the first actuator axle.

15. The extrusion printer according to claim 14, wherein, for each one of the stack of modules, the first meshing gear comprises a first through hole extending axially through the first meshing gear, wherein the first through hole is profiled for cooperating with the first actuator axle for transferring rotational energy from the first actuator axle to the first meshing gear, and wherein the controlling is further arranged for controlling at least the first inlet valve.

16. The extrusion printer according to claim 14, wherein, each module of the stack of modules comprises an actuatable first diversion valve, wherein the casing comprises a first diversion channel connecting the first outlet channel via the actuatable first diversion valve, wherein the first diversion valve is arranged to assume, in response to a control signal, either one of:

a printing position, wherein the first material, is allowed to pass through the first nozzle for printing; and a diverting position, wherein the first material is diverted from the first nozzle to the first diversion channel, and wherein the controller is further arranged for controlling at least the actuatable first diversion valve.

17. The module according to claim 11, wherein the module is configured for, in the stackable arrangement in cooperation with the at least one further module, cooperating with a nozzle plate comprising a plurality of nozzles, for printing the first or second material via the first or second outlet through one or more of the nozzles of the nozzle plate.

* * * * *